United States Patent
Souillac (10) Patent No.: US 8,646,393 B2
(45) Date of Patent: Feb. 11, 2014

(54) DEVICE CAPABLE OF PROVIDING A WRITING SUPPORT IN A MOTOR VEHICLE AND FASCIA PANEL COMPRISING SUCH A DEVICE

(75) Inventor: Arnaud Souillac, Sevres (FR)

(73) Assignee: Renault S.A.S., Boulogne Billancourt (FR)

( * ) Notice: Subject to any disclaimer, the term of this patent is extended or adjusted under 35 U.S.C. 154(b) by 109 days.

(21) Appl. No.: 13/259,827

(22) PCT Filed: Jun. 25, 2010

(86) PCT No.: PCT/FR2010/051300
§ 371 (c)(1),
(2), (4) Date: Oct. 31, 2011

(87) PCT Pub. No.: WO2011/001074
PCT Pub. Date: Jan. 6, 2011

(65) Prior Publication Data
US 2012/0049558 A1  Mar. 1, 2012

(30) Foreign Application Priority Data
Jun. 30, 2009  (FR) ..................................... 09 03194

(51) Int. Cl.
*A47B 37/00* (2006.01)

(52) U.S. Cl.
USPC ............................... 108/45; 108/6; 296/37.12

(58) Field of Classification Search
USPC ......... 108/42, 44, 45, 1, 5, 6, 9, 33; 248/27.1, 248/27.3; 296/37.1, 37.8, 37.12
See application file for complete search history.

(56) References Cited

U.S. PATENT DOCUMENTS

| | | | | |
|---|---|---|---|---|
| 2,275,060 A * | 3/1942 | Griffin | ..................... | 312/334.27 |
| 2,522,602 A * | 9/1950 | Burns | .............. | 281/12 |
| 2,621,093 A * | 12/1952 | Merhige et al. | ................. | 108/45 |
| 2,719,066 A * | 9/1955 | Budzinski | ....................... | 108/33 |
| 3,104,895 A * | 9/1963 | Feuerbach et al. | ............ | 248/455 |
| 4,619,386 A | 10/1986 | Richardson | | |
| 4,792,174 A * | 12/1988 | Shioda | ....................... | 296/37.12 |
| 5,337,677 A * | 8/1994 | Peeno | ............................ | 108/45 |

(Continued)

FOREIGN PATENT DOCUMENTS

| | | |
|---|---|---|
| DE | 10 2007 036 439 | 2/2009 |
| EP | 0 958 961 | 11/1999 |

(Continued)

OTHER PUBLICATIONS

International Search Report Issued Dec. 6, 2010 in PCT/FR10/051300 Filed Jun. 25, 2010.

*Primary Examiner* — Daniel Rohrhoff
(74) *Attorney, Agent, or Firm* — Oblon, Spivak, McClelland, Maier & Neustadt, L.L.P.

(57) ABSTRACT

A device configured to provide a writing support in a motor vehicle. The device includes: a tablet that can be mounted in the motor vehicle element that includes an opening; a translation mechanism for allowing translationary movement of the tablet between a rest position in which the tablet is housed in the motor vehicle element and an intermediate position in which the tablet is extracted from the motor vehicle element through the opening; a rotation mechanism that rotates the tablet to allow the tablet to be rotated from the intermediate position into a position of use in which the tablet is inclined to form a writing support.

8 Claims, 4 Drawing Sheets

(56) References Cited

U.S. PATENT DOCUMENTS

| | | | | |
|---|---|---|---|---|
| 5,485,944 | A | * | 1/1996 | Kauffman ............... 224/277 |
| 5,487,342 | A | * | 1/1996 | Mack ....................... 108/42 |
| 5,671,686 | A | * | 9/1997 | Hurley et al. ............. 108/45 |
| 6,685,152 | B2 | * | 2/2004 | Shirase et al. ........... 248/311.2 |
| 7,293,507 | B2 | * | 11/2007 | DePue et al. .............. 108/44 |
| 7,963,231 | B2 | * | 6/2011 | Osborne et al. ........... 108/40 |
| 2007/0000959 | A1 | * | 1/2007 | Perin ....................... 224/275 |
| 2008/0121762 | A1 | * | 5/2008 | Slatosch et al. .......... 248/27.1 |

FOREIGN PATENT DOCUMENTS

| | | |
|---|---|---|
| FR | 2 851 530 | 8/2004 |
| GB | 2 436 545 | 10/2007 |
| JP | 2004 196090 | 7/2004 |

* cited by examiner

DEVICE CAPABLE OF PROVIDING A WRITING SUPPORT IN A MOTOR VEHICLE AND FASCIA PANEL COMPRISING SUCH A DEVICE

BACKGROUND

The present invention relates to a fascia panel for a motor vehicle which comprises a tablet that can be used as a writing support.

Document FR 2 851 530 describes a motor vehicle fascia panel which comprises a recess used for storage and closed by a substantially horizontal cover. The cover can pivot from its horizontal position, in which it closes the recess, to a position in which it hangs from the fascia panel, forming an inclined surface that can be used as a writing support.

One drawback of this type of fascia panel is the space requirement of the cover in the closed position. The presence of the cover prevents the installation of other functional members in the fascia panel.

BRIEF SUMMARY

Therefore, an object of the present invention is to propose a new device is capable of providing a writing support in a motor vehicle.

1 This object is achieved by means of a device capable of providing a writing support in a motor vehicle. According to the invention, this device comprises:
 a tablet that is capable of being mounted in a motor vehicle element which has an opening;
 translation means for translating the said tablet between a rest position in which the said tablet is housed in the said motor vehicle element and an intermediate position in which the said tablet is drawn out of the said motor vehicle element through the said opening;
 rotation means for rotating the said tablet in order to allow the said tablet to be rotated from the said intermediate position to a position of use in which the said tablet is inclined in order to form a writing support.

2 The motor vehicle element may be a fascia panel or any other element of interior trim of the vehicle.

3 Advantageously, the device may comprise a housing which comprises an opening and which is capable of being mounted in the said motor vehicle element and the said tablet is mounted so as to be able to move in translation in the said housing by means of the said translation means.

4 The housing makes it easy to mount the device of the invention in any motor vehicle element. For this it is sufficient to arrange in this motor vehicle element an opening through which the housing is mounted.

5 Advantageously, the device comprises first locking means for locking the rotation means which interact with the said translation means in order to to prevent the rotation of the said tablet when the said tablet is in a position between the said rest position and the said intermediate position and to allow the said tablet to rotate when the said tablet is in the said intermediate position.

6 These locking means make it possible to prevent the tablet from rubbing against the inside of the motor vehicle element or the top wall of the housing when the device has one. According to the invention, the term "housing" designates an element comprising at least two lateral walls in order to allow the tablet to be mounted in translation.

7 According to one embodiment, the device comprises second locking means for locking the rotation means which prevent the said tablet from rotating when the said tablet is in the said position of use. Such means make it possible to provide a firm support on the tablet when the user uses it as a writing support.

8 The device may comprise first locking means for locking the said translation means which interact with the said rotation means in order to lock the said translation means during the rotation of the said tablet from the said intermediate position to the said position of use. The presence of such means makes it possible to break down the movement of the tablet which makes its use easier for the user who does not risk moving the tablet in translation while he causes it to pivot.

9 According to the invention, when the tablet is in its position of use, that is to say inclined, the tablet may be at a distance from the motor vehicle element. In this case, the tablet is first placed in the intermediate position and then pivoted into the position of use.

10 Advantageously, the said first locking means for locking the said translation means interact with the said rotation means in order to allow the translation of the said tablet to the said motor vehicle element when the said tablet is in the said position of use. In this case, the inclined tablet is again placed into the motor vehicle element or the housing, which allows a better compactness of the device in the position of use. Robustness is also increased because the translation means are housed in the motor vehicle element or the housing during the use of the tablet as a writing support.

11 The device may also comprise second locking means for locking the said translation means which interact with the said rotation means in order to prevent the said tablet from translating when the said tablet is in the said position of use and translated to the said motor vehicle element. These locking means make it possible to secure the tablet in the position of use, the tablet not being in danger of coming out of the housing or of the motor vehicle element under the effect of impacts and vibrations, for example.

12 According to one embodiment, the said rotation means comprise at least one circularly arcuate slot and a pin which slides in the said slot in order to allow the said tablet to rotate, the said second and/or first rotational locking means comprise an elbow which extends the said slot and in which the said pin is housed when the said tablet is respectively in a position between the said rest position and the said intermediate position, and/or in the said position of use, the said pin is capable of butting against the edge of the said elbow in order to prevent the said tablet from rotating in the said intermediate position and the translation means move the said pin out of the said elbow in order to allow the said tablet to rotate.

13 According to a second embodiment, the said second rotational locking means comprise a tilting abutment mounted so as to slide in the said motor vehicle element and a tie mounted so as to pivot beneath said tablet and in the said position of use, the said tilting abutment interacts with the said tie in order to prevent the reverse rotation of the said tablet.

14 According to a third embodiment which is combined with the first embodiment, the said first locking means for locking the translation means comprise:
 abutments mounted so as to be able to move in a direction substantially perpendicular to the direction of translation of the said tablet and coupled to the said rotation means by means of a slide; and
 openings made;
in the said intermediate position of the said tablet, the said abutments interact with the said openings in order to prevent the said tablet from translating and when the said tablet is rotated by a user into the said position of use, the said rotation means move the said movable abutments out of the said openings by means of the said slide.

15 According to a particular embodiment, the said second translational locking means comprise a locking arm mounted so as to rotate on the said tablet between an inactive position, in which the said locking arm is substantially parallel to the said tablet and an active position with which its end interacts with a recess.

16 The present invention also relates to a fascia panel comprising the device of the invention.

BRIEF DESCRIPTION OF THE DRAWINGS

Other particular features and advantages of the invention will emerge on reading the description given below of three particular embodiments of the invention given as an indication but not being limiting, with reference to the appended drawings in which.

DETAILED DESCRIPTION

Figure 1:
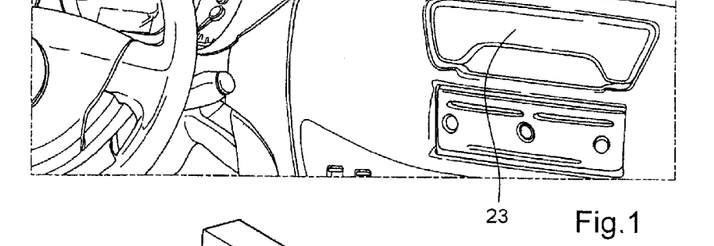
FIG. 1 represents a view in perspective of a fascia panel in which the device of the invention is installed.

With reference to FIG. 1, the fascia panel of the invention has an outer surface 1 on which various functional elements are flush fitted or protruding. In the rest position of the tablet, only the end face of the latter is placed on the outer surface 1 of the fascia panel. In the embodiment shown here, a facade 23 is covers the end face of the tablet and is visible on the front vertical wall of the fascia panel beside the steering wheel of the vehicle. The tablet is therefore housed horizontally inside the fascia panel.

Figures 2, 3:
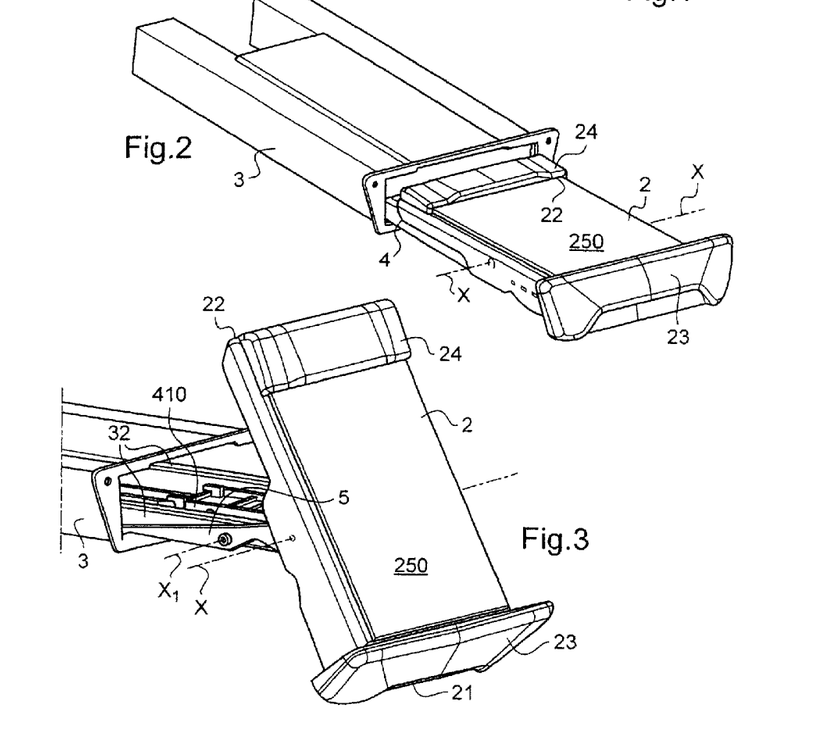
FIG. 2 represents a view in perspective of a first embodiment of the invention, the tablet being in the intermediate position.
FIG. 3 represents the device of FIG. 2, the tablet being in the intermediate position but tilted.

FIG. 2 represents a first particular embodiment of the invention. According to this embodiment, a housing 3 contains the tablet 2 and can be mounted in a cavity arranged in a fascia panel. In the particular embodiment shown here, the tablet 2 is mounted so as to slide in the housing 3 by means of rails 32, which are visible in FIG. 3, by means of a supporting part 4. The tablet 2 comprises, at a first edge called the "bottom edge", the aforementioned facade 23 which extends in a plane substantially perpendicular to the tablet 2. The other edge of the tablet, also called the "top edge" comprises a clip 24 which makes it possible to fix a sheet of paper or other element to the tablet. The wall of the tablet which comprises the clip 24 is called the "functional wall" 250. In FIG. 2, the tablet 2 is fully out of the housing 3 but remains horizontal. It is therefore in its intermediate position but not pivoted.

FIG. 3 represents the tablet 2 in its pivoted intermediate position; the supporting part 4 has not been shown. The tablet 2 is thus tilted about its rotation axis X. The bottom edge, secured to the facade 23, is placed towards the bottom, while the top edge is placed towards the top. In this intermediate position, the tablet 2 is at the end of travel of the parallel guide rails 32 which slide in the housing 3. The tablet 2 is mounted so as to slide on the guide rails 32 by means of the supporting part 4 (visible in FIG. 2) which is placed on the two rails 32 and which slides between the latter at the same time as the tablet 2. A flat slide 410 slides between the rails 32. The tablet 2 is mounted at the front edge of the supporting part 4; the front being defined as the direction situated beyond the opening of the housing 3. A locking arm 5 mounted so as to pivot on each of the rails 32 allows the tablet 2 to be locked in translation on the guide rails 32 as explained below. This locking arm 5 extends parallel to the rail 32 and comprises a first end housed in the housing 3 and a second end secured to the tablet 2. The locking arm 5 is mounted so as to pivot on a rotation axis X1 parallel to X and situated substantially in the middle of the guide rail 32.

Figure 4:
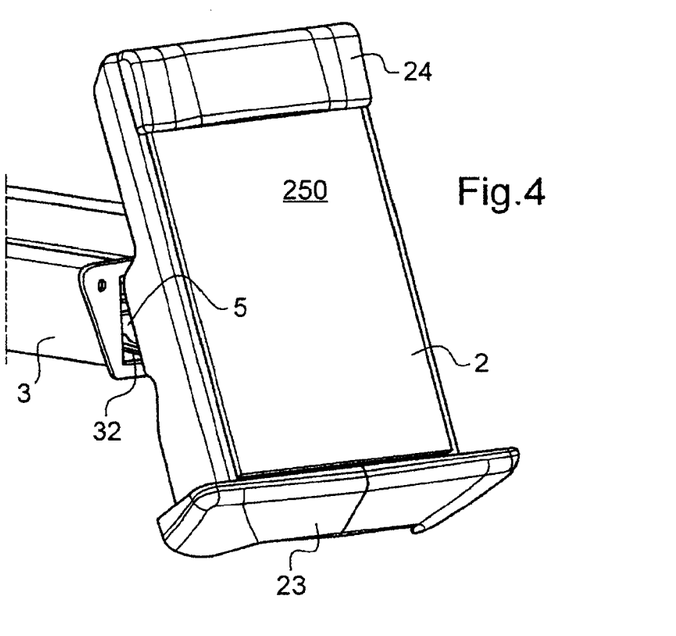
FIG. 4 represents the device of FIG. 3, the tablet being in the position of use.

As shown in FIG. 4, when the tablet 2 is in its position of use, the tablet 2 is inclined as shown in FIG. 3 and pushed towards the housing 3. In the position of use, the guide rails 32, the supporting part 4 and the flat slide (which is internal) 410 are almost entirely housed in the housing 3. Only the tablet 2, inclined to serve as a writing support, is outside the housing 3 and therefore protrudes on the outer face of the fascia panel 1 when the housing 3 is mounted in the fascia panel.

Figure 5:
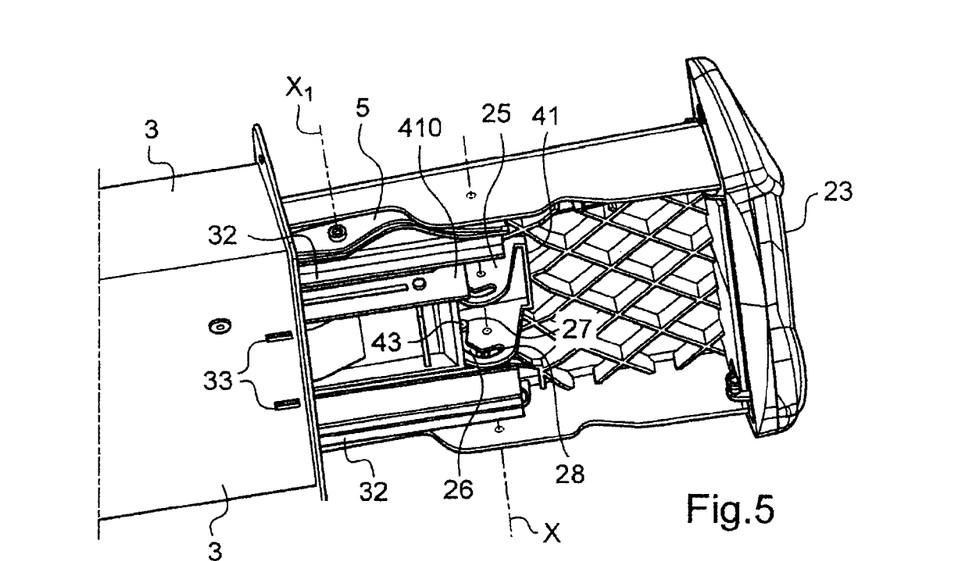
FIG. 5 represents a view from below of the device of FIG. 2.

FIG. 5 represents a view from below of the tablet 2 and of the housing 3, when the tablet 2 is in the intermediate position but not inclined, as shown in FIG. 2. The flat slide 410 is placed under the tablet 2. Ties 25 extend vertically beneath the tablet 2 in a direction perpendicular to the plane of the tablet 2. These two ties 25 are placed face to face and separated from one another across the width of the tablet 2. Each of the ties 25 comprises a circularly arcuate slot 26. This slot 26 extends in a plane perpendicular to the tablet 2 and parallel to the direction of translation of the tablet, that is to say to the rails 32. Each slot 26 is extended by a top elbow 27 and a bottom elbow 28. The slots 26 are placed so as to partially surround the rotation axis X of the tablet 2. A pin 43 secured to the flat slide 410 is engaged in each of the slots 26 and can slide in the latter in order to allow the tablet 2 to rotate under the action of a user. The elbows, top and bottom, 27 and 28, form with the pin 43 the first and second means for locking the rotation of the tablet 2. In FIG. 5, the pins 43 are in abutment in the top elbows 27 and thus prevent the tablet 2 from pivoting about its rotation axis X by butting against the edge of the elbow 27. The tablet 2 therefore remains horizontal. The same locking effect is obtained when the pin 43 is in the bottom elbow, the tablet 2 then being in the position of use.

As shown in FIG. 5, the housing 3 comprises, close to its opening, two openings 33 which are arranged in the bottom face of the housing 3. The edge of the flat slide 410 which is housed in the housing 3 comprises two movable abutments 45 (see FIG. 6) which can fit into these openings 33 in order to prevent the tablet 2 from translating, when the tablet 2 is in the intermediate position but not totally inclined in order to be used as a writing support. The openings 33 and the movable abutments 45 form the first translational locking means.

Figure 6:
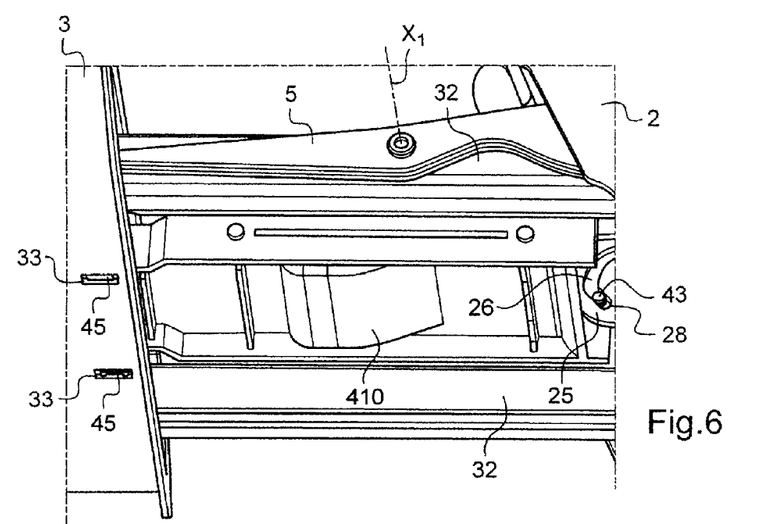
FIG. 6 represents a view from below of the device of FIG. 3.

FIG. 6 represents a partial view of the tablet in the intermediate position, the tablet 2 being inclined to serve as a writing support. In this position, the pins 43 are in abutment in the bottom elbows 28 preventing the tablet 2 from rotating. The movement of the pins 43 into abutment in the bottom elbows 28 causes the flat slide 410 to slide forwards and disengages the abutments 45 from the openings 33. The translation of the tablet 2 is therefore possible, this time in the direction of the housing 3, since the tablet 2 is at the end of travel at the end of the rails 32.

Figure 7:
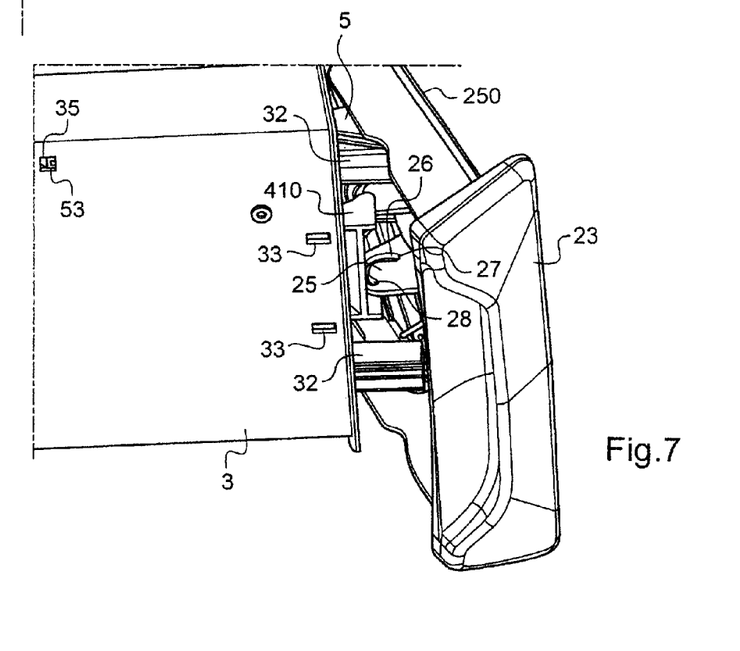
FIG. 7 represents a view from below of the device of FIG. 4.

FIG. 7 represents in detail the second translational locking means of the invention. These second locking means involve only the position of use. The housing 3 comprises a recess (or opening) 35 placed on the bottom wall of the housing 3 behind the openings 33 and substantially close to the lateral edge of the housing 3. The pivoting locking arm 5 comprises, at its end housed in the housing 3, a lug 53 which is in contact with the bottom wall of the housing 3. When the tablet 2 is inclined and pushed back towards the housing 3, that is to say when it is in the position of use, the end of the locking arm 5 which comprises the lug 53 is above the recess 35. The lug 53 falls into the recess 35 and thus prevents the tablet 2 from translating.

The use of the aforementioned embodiment will now be described with reference to FIGS. 1 to 7.

The tablet 2 is in the rest position, as shown in FIG. 1. Only the facade 23 can be grasped by the user via its handle shape and because it protrudes slightly from the outer surface of the fascia panel. The user pulls on the facade 23 which serves as a handle and slides the rails 32 into and then out of the housing 3. The supporting part 4 slides with the rails 32. Throughout this translation, the pins 43 remain in abutment in the top elbows 27, as shown in FIG. 5. When the user begins to tilt the tablet 2, this rotation causes a movement of the pin 43 in the top elbow 27, the said movement causing a slight translation of the flat slide 410 rearwards, the said translation causing the abutments 45 to descend in the openings 33 which prevents the tablet 2 from translating. The user can therefore, by tilting the tablet 2, move the pin 43 in the slot 26. When the pin 43 reaches abutment in the bottom elbow 28, the rotation of the tablet 2 is stopped and the flat slide 410 slides slightly forward which has the effect of disengaging the abutments 45 from the openings 33. The translation of the tablet 2 on the guide rails 32 is thus possible in the direction of the housing 3. The user therefore pushes the tablet 2, which remains inclined in the position of use, towards the housing 3. The end of the locking arm 5 which is housed in the housing 3 slides on the bottom wall of the housing 3 until the lug 53 fits into the recess 35 to prevent the tablet 2 from translating, the latter being inclined in the position of use.

The tablet 2 is unlocked in the following manner. When the tablet 2 is in the position of use, rotation is prevented because the pin 43 is locked in the bottom elbow 28 of the slot 26. When the user begins the translation of the tablet 2, the locking arm 5 tilts so as to disengage the lug 53 from the recess 35. Specifically, the function of the lug 53 is to provide a hard point but not a total lock: the force applied by the user is sufficient to disengage the lug 53 due to its beveled shape. The tablet 2 can therefore be moved out in translation from the housing 3, the rotation of the tablet 2 being locked. When the tablet 2, which remains in the position of use, that is to say inclined, reaches the end of travel (the intermediate position), the user can pivot the tablet 2 to the horizontal. The beginning of pivoting of the tablet 2 causes a movement of the pin 43 in the slot 26, the said movement causing the flat slide 410 to slide rearwards, the said sliding causing the abutments 45 to descend into the openings 33, the said descent causing a locking of the translation. When the tablet 2 is in the rest position and the pin 43 is housed in the top elbow 27, this causes the flat slide 410 to slide forwards, the said sliding causing the abutments 45 to rise out of the openings 33, the said rising again allowing the tablet 2 to be translated to the rest position.

Figure 8:
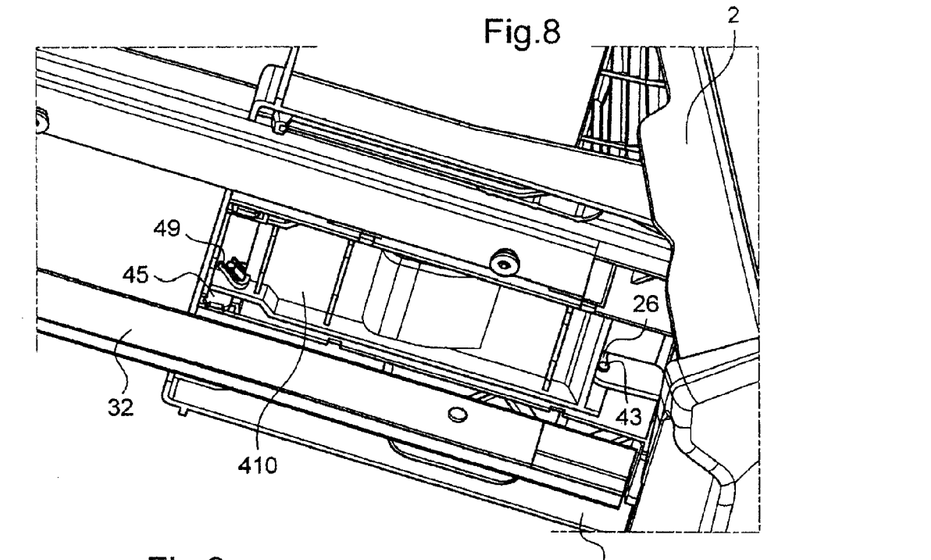
FIG. 8 represents a partial view of the rotation means coupled to the first translational locking means of a second embodiment of the invention.

FIG. 8 shows in greater detail the interaction between the movable abutments 45 and the means for rotating the tablet 2, in a second embodiment. In this second embodiment, the abutments 45 are mounted so as to be able to move in translation in a vertical direction, perpendicular to the rails 32. The elements in common with the first embodiment bear identical references. The slots 26 and the elbows, top and bottom 27 and 28, are arranged in the side wall of the tablet 2 which extends perpendicularly to the functional wall 250 of the tablet, the functional wall 250 being defined as the flat wall which serves as a writing support in the position of use. The pins 43 are placed at the end of a flat slide 410 mounted on the supporting part 4 and able to slide in a horizontal direction in this supporting part 4. The other end of the slide, that which is oriented towards the housing 3, comprises an oblique slot 49 in which a pin secured to the movable abutment 45 is engaged. Thus, the movement of the pin 43, whether it is done directly by the user to rotate the tablet 2 or it is due to a movement caused by the translation of the tablet 2, sets the movable abutment 45 in motion. Thus, when the pin 43 is housed in the top end of the slot 26, the abutment 45 is raised in the housing 3, the pin of the abutment 45 being in abutment in the top end of the oblique slot 49. When the pin 43 is in the bottom elbow 28, the movable abutment 45 is lowered towards the bottom of the housing 3, the pin secured to the movable abutment 45 being placed in the oblique slot 49.

The movement sequence of this second embodiment is as follows. When the tablet 2 is in the rest position, the user pulls on the facade 23. The pin 43 is in the top elbow 27 and prevents the tablet from rotating, as in the first embodiment. When the tablet begins to pivot, the pin 43 descends slightly and takes position in the circularly arcuate slot 26. This movement causes a sliding of the flat slide 410 towards the rear, which causes the translation of the abutments 45 via the slot 49, the said abutments being housed in the openings 33, which prevents the tablet 2 from translating. The user pivots the tablet 2 into its position of use. The movement of the pin 43 in the slot 26 up to the bottom elbow 28 causes the translation of the flat slide 410 towards the opening of the housing 3. The movable abutment 45 rises again under the effect of the movement of the oblique slot 49 which again allows the tablet 2 to translate.

Figure 9:
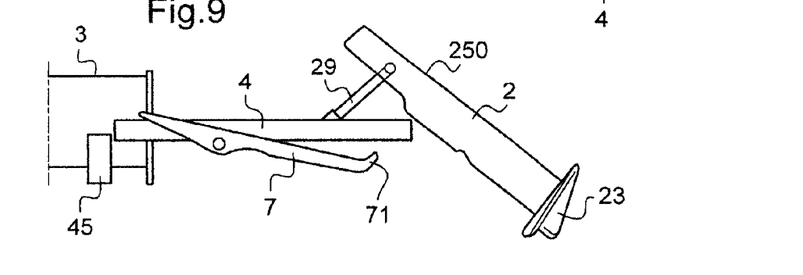
FIG. 9 represents a schematic view in longitudinal section of a third embodiment of the invention, the tablet being in the intermediate position but not inclined.
Figure 10:
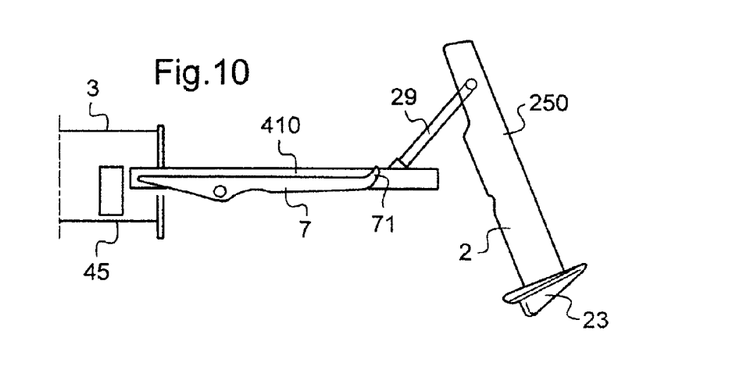
FIG. 10 represents the device of FIG. 9, the tablet being in the intermediate position and inclined.

FIGS. 9 and 10 represent a third embodiment of the invention. The elements of this third embodiment which are common with the second embodiment described above bear identical references. This third embodiment comprises a plate 7 mounted so as to pivot beneath the flat slide 410. This plate 7 forms a tilting abutment. The plate 7 is mounted so as to be able to rotate between an inactive position in which it is parallel to the flat slide 410 and an active position in which it is pivoted downwards, beneath the slide 410. The plate 7 comprises on its free front edge a return 71 which is substantially perpendicular to the plate 7 and oriented towards the tablet 2. Guide forms, arranged in the bottom of the housing 3, guide the movement of the plate 7 depending on the length of the portion of plate 7 that is out of the housing 3.

In addition to the plate 7, the second rotational locking means also comprise a tie 29 forming a swinging link mounted rotatably behind the functional wall 250 of the tablet 2. This tie 29 can be moved between an inactive position, in which it is folded behind the functional wall 250 (therefore parallel to the rails 32), the latter being in the rest position, that is to say horizontal, and an active position in which it forms an angle with the rails 32 and the flat slide 410. The free end of the tie 29 is in sliding contact with the horizontal surface of the flat slide 410.

How this third embodiment operates will now be described with reference to FIGS. 9 and 10. The movement of the tablet 2 from the rest position to the intermediate position is the same as described with reference to the first embodiment. In this embodiment, the rotational locking is more robust. It can be combined with the other two embodiments that have been described. When the tablet 2 is almost pulled out to its intermediate position, the user causes the tablet 2 to pivot into its position of use. This rotation is made possible because of the absence of a top elbow 27. The user pivots the tablet 2 so as to incline its facade 23 downwards. This movement pulls in translation the movable abutments 45 which enter the openings 33 in order to prevent the tablet 2—supporting part 4 assembly from translating. At the end of translation of the tablet 2, the front of the plate 7 first falls beneath the flat slide 410. The pivoting of the tablet 2 causes the movement of the tie 29, the free end of which slides on the flat slide 410. When the tablet 2 reaches the position of use, the abutments 45 again rise from the openings 33 which releases the tablet 2 to translate. At the beginning of the translation of the tablet 2, the guide forms cause a pivoting of the plate 7 to the horizontal position and its return 71 protrudes over the flat slide 410. The end of the tie 29 is situated close to the front edge of the flat slide 410 and butts against the return 71 in order to prevent the tablet 2 from rotating from the position of use to the intermediate position (out of the housing 3 but not inclined). As in the second embodiment, the rotation means which interact with the first translational locking means which are the movable abutments 45 raise the latter when the tablet 2 is in the position of use. The tablet 2, the flat slide 410 and the plate 7 which is horizontal can again be slid into the housing 3. The operation is then identical to that described with reference to the first embodiment.

The invention claimed is:

1. A device capable of providing a writing support in a motor vehicle, comprising:
    a tablet capable of being mounted in a motor vehicle element which has an opening;
    translation means for translating the tablet between a rest position in which the tablet is housed in the motor vehicle element and an intermediate position in which the tablet is drawn out of the motor vehicle element through the opening;
    rotation means for rotating the tablet to allow the tablet to be rotated from the intermediate position to a position of use in which the tablet is inclined to form a writing support, the rotation means comprising at least one circularly arcuate slot and a pin which slides in the slot to allow the tablet to rotate;
    first locking means for locking the translation means which interact with the rotation means to lock the translation means during the rotation of the tablet from the intermediate position to the position of use, and the first locking means for locking the translation means interacts with the rotation means to allow translation of the tablet to the motor vehicle element when the tablet is in the position of use; and
    first locking means for locking the rotation means which interact with the translation means to prevent the rotation of the tablet when the tablet is in a position between the rest position and the intermediate position and to allow the tablet to rotate when the tablet is in the intermediate position, the first locking means for locking the rotation means comprising an elbow which extends the slot and in which the pin is housed when the tablet is respectively in a position between the rest position and the intermediate position or the position of use,
    wherein the pin is configured to butt against an edge of the elbow to prevent the tablet from rotating, and
    wherein, in the intermediate position, the translation means moves the pin out of the elbow to allow the tablet to rotate.

2. A device according to claim 1, further comprising a housing which comprises an opening and which is capable of being mounted in the motor vehicle element, and
    the tablet is mounted to move in translation in the housing by the translation means.

3. A device according to claim 1, further comprising second locking means for locking the rotation means which prevents the tablet from rotating when the tablet is in the position of use.

4. A device according to claim 1, further comprising second locking means for locking the translation means which interacts with the rotation means to prevent the tablet from translating when the tablet is in the position of use and translated to the motor vehicle element.

5. A device according to claim 4, wherein the second locking means for locking the translation means comprises a locking arm mounted so as to rotate on the tablet between an inactive position, in which the locking arm is substantially parallel to the tablet and an active position with which an end of the locking arm interacts with a recess.

6. A fascia panel, comprising the device according to claim 1.

7. A device capable of providing a writing support in a motor vehicle, comprising:
    a tablet capable of being mounted in a motor vehicle element which has an opening;
    translation means for translating the tablet between a rest position in which the tablet is housed in the motor vehicle element and an intermediate position in which the tablet is drawn out of the motor vehicle element through the opening;
    rotation means for rotating the tablet to allow the tablet to be rotated from the intermediate position to a position of use in which the tablet is inclined to form a writing support, the rotation means comprising at least one circularly arcuate slot and a pin which slides in the slot to allow the tablet to rotate;
    first locking means for locking the translation means which interact with the rotation means to lock the translation means during the rotation of the tablet from the intermediate position to the position of use, and the first locking means for locking the translation means interacts with the rotation means to allow translation of the tablet to the motor vehicle element when the tablet is in the position of use; and
    second locking means for locking the rotation means which prevents the tablet from rotating when the tablet is in the position of use,
    wherein the second locking means for locking the rotation means comprises a tilting abutment mounted so as to slide in the motor vehicle element and a tie mounted so as to pivot beneath the tablet and wherein, in the position of use, the tilting abutment interacts with the tie to prevent the reverse rotation of the tablet.

8. A device capable of providing a writing support in a motor vehicle, comprising:
    a tablet capable of being mounted in a motor vehicle element which has an opening;

translation means for translating the tablet between a rest position in which the tablet is housed in the motor vehicle element and an intermediate position in which the tablet is drawn out of the motor vehicle element through the opening;

rotation means for rotating the tablet to allow the tablet to be rotated from the intermediate position to a position of use in which the tablet is inclined to form a writing support, the rotation means comprising at least one circularly arcuate slot and a pin which slides in the slot to allow the tablet to rotate; and first locking means for locking the translation means which interact with the rotation means to lock the translation means during the rotation of the tablet from the intermediate position to the position of use, and the first locking means for locking the translation means interacts with the rotation means to allow translation of the tablet to the motor vehicle element when the tablet is in the position of use, wherein the first locking means for locking the translation means comprises:

abutments mounted to move in a direction substantially perpendicular to the direction of translation of the tablet and coupled to the rotation means by a slide; and openings;

wherein, in the intermediate position of the tablet, the movable abutments interact with the openings to prevent the tablet from translating and wherein, when the tablet is rotated by a user into the position of use, the rotation means moves the movable abutments out of the openings by the slide.

* * * * *